(12) United States Patent
Fall et al.

(10) Patent No.: US 7,009,558 B1
(45) Date of Patent: Mar. 7, 2006

(54) VEHICLE MOUNTED SATELLITE TRACKING SYSTEM

(75) Inventors: Terrence L. Fall, Thousand Oaks, CA (US); Frank J. Hules, Calabassas, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/079,706

(22) Filed: Mar. 14, 2005

(51) Int. Cl.
*H01Q 3/00* (2006.01)

(52) U.S. Cl. .................................................. 342/359
(58) Field of Classification Search ............. 342/75, 342/359, 357.11, 357.15; 343/754, 757, 343/758
See application file for complete search history.

(56) References Cited

U.S. PATENT DOCUMENTS

| | | | |
|---|---|---|---|
| 6,122,960 A * | 9/2000 | Hutchings et al. | 73/493 |
| 6,433,736 B1 * | 8/2002 | Timothy et al. | 342/359 |
| 6,754,584 B1 * | 6/2004 | Pinto et al. | 701/215 |
| 2002/0050943 A1 * | 5/2002 | Toda et al. | 342/357.04 |
| 2002/0180634 A1 * | 12/2002 | Carson | 342/74 |
| 2003/0016172 A1 * | 1/2003 | Natsume et al. | 342/359 |
| 2003/0080898 A1 * | 5/2003 | Wang et al. | 342/359 |

* cited by examiner

*Primary Examiner*—Dao Phan
(74) *Attorney, Agent, or Firm*—Stefan V. Chmielewski

(57) ABSTRACT

A satellite tracking system includes a vehicle having an attitude measuring device for measuring an attitude of the vehicle. An antenna is mounted on the vehicle. An antenna pointing device is coupled to the antenna and points the antenna in a direction dependent upon the attitude measured by the attitude measuring device and a location of a satellite.

20 Claims, 7 Drawing Sheets

VEHICLE MOUNTED SATELLITE TRACKING SYSTEM

TECHNICAL BACKGROUND

The present invention relates to satellite tracking systems, and, more particularly, to mobile satellite tracking systems for use in a motor vehicle.

BACKGROUND OF THE INVENTION

Various methods have been employed to allow an antenna mounted on a vehicle to track a satellite with various goals and constraints. Generally utilized is a hybrid tracking system including a vehicle attitude measuring component and a satellite pointing error feedback component. More weight is typically given to the satellite pointing error feedback than to the vehicle attitude measurements.

The vehicle attitude measurement component in the tracking system is usually in the form of an inertial measurement unit (IMU). The IMU may include one or more angular rate sensors and one or more linear accelerometers. The suite of sensors is usually kept to a minimum, with two accelerometers for tilt and two angular rate sensors for yaw and pitch. However, to reduce cost, sometimes only one angular rate sensor for yaw measurement is employed. Tracking systems that do not have an IMU use other sensors on the vehicle, such as a vehicle speed sensor and a steering angle sensor. Some vehicle tracking systems use global positioning system (GPS) vectoring or some type of magnetic pointing device to derive vehicle heading, while others have no such sensor.

The satellite pointing error feedback component used in the tracking systems varies widely as well, but can be determined via either all electronic beam steering; some electronic beam steering with some mechanical steering; or all mechanical steering. In order to derive pointing error, some method of dithering the beam, moving it back and forth in one or two axes, is employed. Signal amplitude at these various positions is compared to the expected maximum signal amplitude, and the distance and direction to the point of peak amplitude is computed. Electronically steering the beam is very fast and produces a high-rate dither, but is also more expensive. The mechanically systems are less expensive, but the dither rate is lower.

Known tracking systems having difficulty acquiring the satellite signal both upon initial startup and after a line of sight between the satellite and the vehicle has been blocked for a length of time, such as by a building or mountain. Such blockages occur frequently in the automotive environment. The tracking systems must scan the antenna beam through the sky in the hope of finding the correct satellite. The area that must be scanned can be quite wide because most systems have little or no dead reckoning capability, and do not know in which direction the satellite is located relative to the vehicle. During this sky-scan, the less than ideal vehicle attitude tracking can cause the acquisition time to be quite lengthy because the same portion of the sky may be scanned more than once or the correct portion of the sky may be missed. The likelihood of locking onto the wrong satellite based upon signal strength alone is quite high because many satellites have identical signatures. The error is often discovered only after a lengthy failure to decode the satellite's data stream.

Another drawback of many of the known tracking systems is their narrow application. Many are designed with wide beams for easier tracking and acquisition, which results in beams having lower gain. In the Asian market, particularly Japan, where a given satellite is targeted toward a small geographic area, the received satellite power is greater, placing less burden on the antenna gain. In North America and Europe, on the other hand, the satellites are targeted toward a larger geographic area, and the look angles are much lower, which requires a more directional antenna with higher gain. The antenna will have a much more narrow beam which is more difficult to keep on target. As frequencies move beyond Ku to Ka, this problem will become worse. These tracking systems are not accurate enough to keep these narrow beams pointed precisely at all times.

While the acquisition time greatly affects the user experience when accessing the data from a satellite, the automotive environment places more demands on the tracking system. The vehicle can experience large transients in roll, pitch, and especially yaw. The satellite is frequently blocked by trees, buildings and hills. Any loss of reception is immediately noticeable when watching television or listening to audio broadcasts. The satellite data stream itself causes difficulties, as a certain amount of time is needed to decode the newly unblocked stream. To enhance the user experience, it is essential that signal-loss time be reduced. The tracking system must monitor the attitude of the vehicle accurately, such that vehicle transients have very little effect on signal strength, and external blockages have minor and short term effects.

U.S. Pat. No. 6,292,759, assigned to the assignee of the present invention, discloses the use of linear accelerometers to measure roll and pitch in estimating a vehicle attitude angle. A blending coefficient is used to combine the roll and pitch with roll and pitch values calculated by integrated roll rate and pitch rate sensors.

What is needed in the art is a satellite tracking system for a motor vehicle that can acquire a satellite signal quickly upon start-up, and can quickly reacquire the satellite signal after a signal blockage due to buildings or some other obstruction.

SUMMARY OF THE INVENTION

The present invention provides a mobile satellite tracking system having a superior level of accuracy. The present invention enables low-power satellites to be tracked with low-profile, high-gain and narrow-beam vehicle antennas. The signal from the satellite can be quickly acquired, and the probability of reception loss is low.

The present invention also provides a satellite tracking system for a motor vehicle that can extend the technique disclosed in U.S. Pat. No. 6,292,759 to cover measuring yaw with magnetometers, and using a blending coefficient to combine this yaw value with a yaw value calculated by integrating a yaw rate sensor.

The present invention further provides an IMU with a highly compensated sensor suite which is tightly integrated with feedback from the satellite pointing such that the tracking system maintains tight tracking of the satellite under all conditions. The tracking may be immediate upon startup, may be continuously updated during normal operation, may maintain pointing during a blockage, and may allow immediate reacquisition after a blockage has passed.

The invention comprises, in one form thereof, a satellite tracking system including a vehicle having an attitude measuring device for measuring an attitude of the vehicle. An antenna is mounted on the vehicle. An antenna pointing device is coupled to the antenna and points the antenna in a direction dependent upon the attitude measured by the attitude measuring device and a location of a satellite.

The invention comprises, in another form thereof, a method of tracking a satellite including providing a vehicle having an antenna mounted thereon. An attitude of the vehicle is measured. The antenna is pointed in a direction dependent upon the measured attitude and a location of the satellite.

An advantage of the present invention is that the use of low profile antennas with high gains and narrow beams is enabled, thus enhancing the user experience.

Another advantage is that the satellite tracking system overcomes the limitations of prior art systems by using a more accurate vehicle attitude tracking sensor suite and algorithm package.

Yet another advantage is that the approximate orientation of the satellite relative to the vehicle can be determined quickly upon startup or an end of blockage, thereby eliminating the need for time consuming random scanning for the satellite upon startup or end of blockage.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
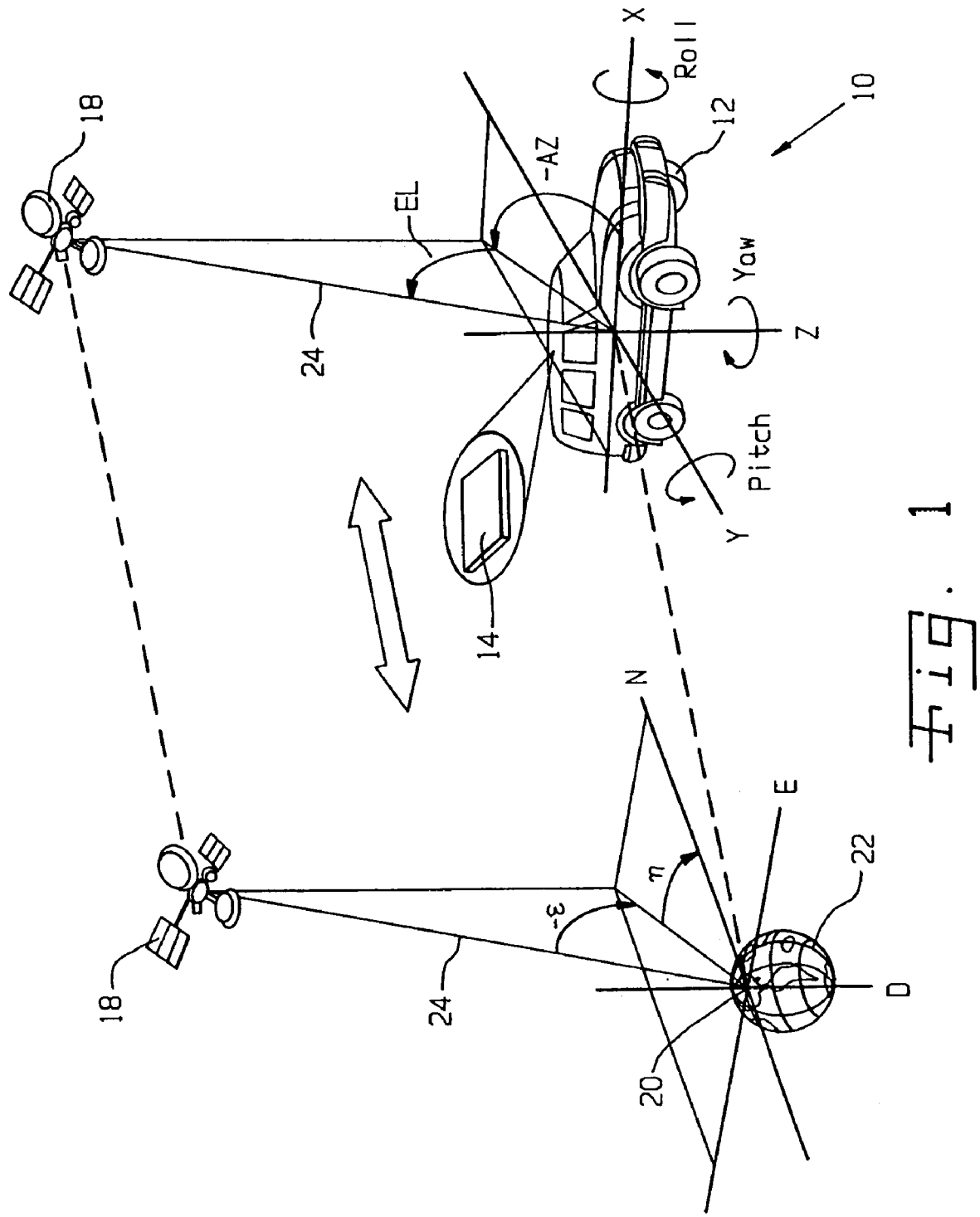
FIG. 1 is a schematic diagram of a vehicle mounted satellite tracking system of the present invention in communication with a satellite.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

Figure 2:
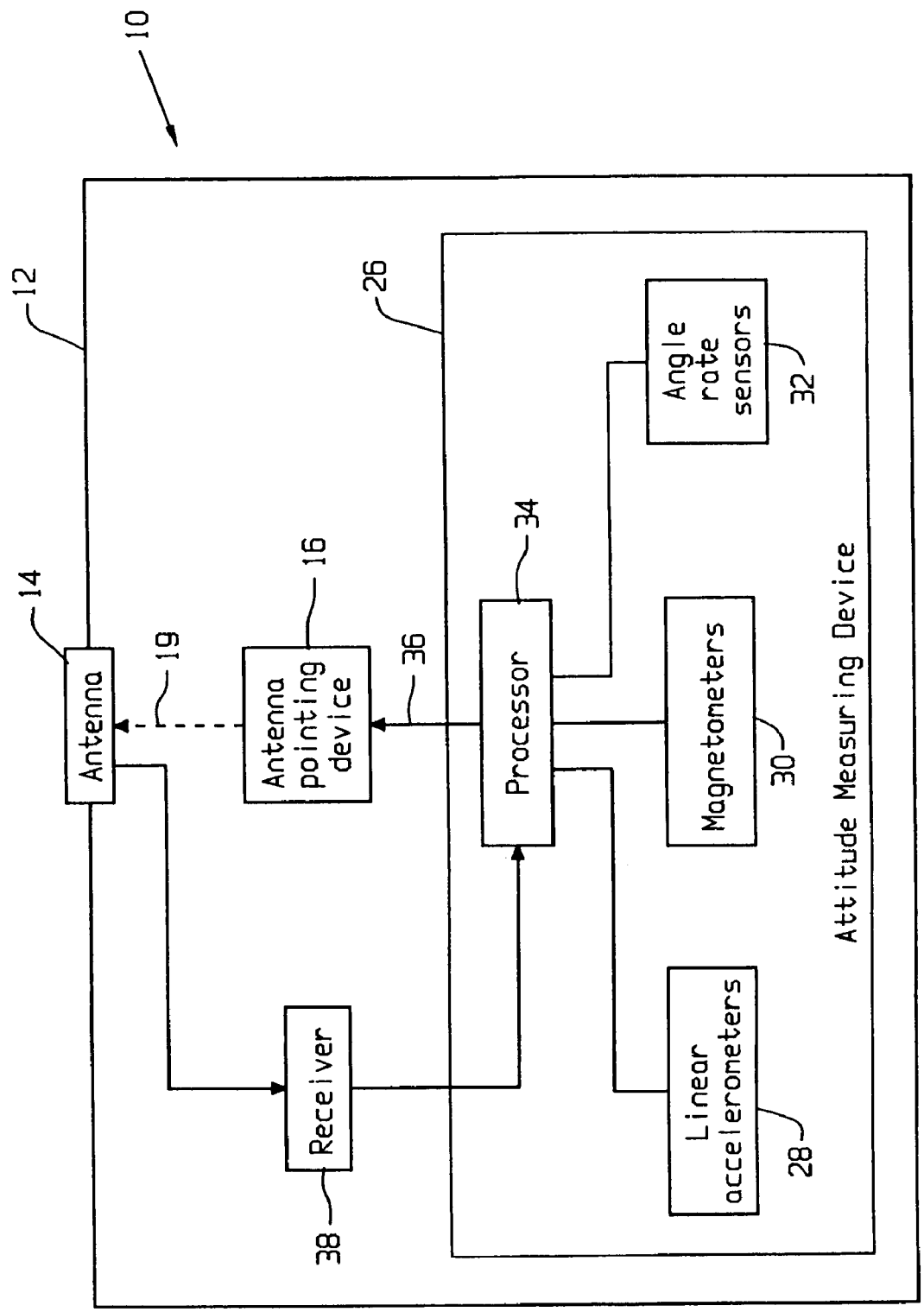
FIG. 2 is a block diagram of the vehicle mounted satellite tracking system of FIG. 1.

Referring now to the drawings, and particularly to FIG. 1, there is shown one embodiment of a vehicle mounted satellite tracking system 10 of the present invention including a motor vehicle 12 having an antenna 14 mounted thereon. Antenna 14 may be a flat antenna and may include a waveguide. Vehicle 12 includes an antenna pointing device 16 (FIG. 2) for pointing antenna 14 in a desired direction, such as at a satellite 18 to thereby improve the reception by antenna 14 of a signal transmitted by satellite 18. The control of the pointing direction of antenna 14 by antenna pointing device 16 is indicated by dashed arrow 19. Antenna pointing device 16 may control the direction in which antenna 14 points electronically, mechanically, or some combination of electronically and mechanically.

The orientation or direction of satellite 18 relative to an approximate point 20 on the surface of the earth 22 at which vehicle 12 is disposed is indicated by vector 24. Satellite 18 may be geostationary such that the position of satellite 18 relative to any point on earth 22 is substantially constant. The point 20 on earth 22 at which vehicle 12 is disposed may be determined by an on-board global positioning system (not shown), or may be derived from a prior determination of the pointing angle of antenna 14 at which reception of the signal from satellite 18 is strongest. Because satellite 18 is very far from earth 22 (typically more than 20,000 miles), a day's travel by vehicle 12, such as a few hundred miles or less, does not appreciably change the orientation of vector 24 between vehicle 12 and satellite 18 for purposes of the present invention.

Vehicle 12 includes an attitude measuring device 26 in the form of an inertial measuring unit (IMU) having three accelerometers 28, three magnetometers 30, and three angle rate sensors 32. IMU 26 also includes a processor 34 for receiving the outputs of accelerometers 28, magnetometers 30, and angle rate sensors 32, and transmitting a control signal 36 to antenna pointing device 16 dependent upon these outputs.

Control signal 36 may also be dependent upon the location of satellite 18 in outer space. This satellite location may be predetermined and stored within processor 34, or within an associated memory device. The satellite location may be specified in terms of a vector 24 between the satellite and a particular location on the surface of earth 22, for example.

Accelerometers 28, also known as "tilt sensors", measure the direction of gravity or of any other force on vehicle 12. Each of the three accelerometers 28 corresponds to a respective one of the x, y and z axes. The x-axis may be defined as the axis in which a vehicle 12 is facing. For a vehicle facing east, the x, y and z axes correspond to the east (E), south (S) and down (D) axes, respectively, in the NED Earth Coordinate System. Similarly each of the three magnetometers 30 corresponds to a respective one of the x, y and z axes, and each of the three angle rate sensors 32 corresponds to a respective one of the x, y and z axes. In order to achieve the correspondence of the sensors to the three axes, the three accelerometers 28 may be mounted orthogonally to each other; the three magnetometers 30 may be mounted orthogonally to each other; and the three angle rate sensors 32 may be mounted orthogonally to each other.

Linear accelerometers 28 and magnetometers are known as absolute type sensors in that their outputs may be expressed relative to some fixed direction or location. That is, the output of an accelerometer may be expressed relative to the fixed downward direction of gravity. Similarly, the output of an accelerometer may be expressed relative to the fixed location of the earth's magnetic pole. In contrast, angle rate sensors are known as relative sensors because their outputs may be expressed relative to some indeterminate initial orientation. That is, the output of an angle rate sensor may indicate movement of vehicle 12 relative to some initial starting orientation, which may not be known with the same exactness that the direction of gravity or the location of the earth's magnetic pole are known.

Accelerometers 28, magnetometers 30 and angle rate sensors 32 conjointly measure an attitude of vehicle 12, specifying the orientation of vehicle 12, or, more particularly, the orientation of the plane defined by antenna 14, in terms of x, y and z coordinates. The attitude of vehicle 12 may be expressed in terms of a roll (rotation about the x-axis) component, a pitch (rotation about the y-axis) component, and a yaw (rotation about the z-axis) component.

The three angles describing the vehicle attitude (roll, pitch and yaw) may be calculated using a combination of absolute sensors and relative sensors. In the case of roll and pitch, the absolute sensors may be linear accelerometers 28, and for yaw the absolute sensors may be magnetometers 30. In all cases the relative sensors may be angular-rate sensors, which may be integrated to form an angle.

Figure 3:
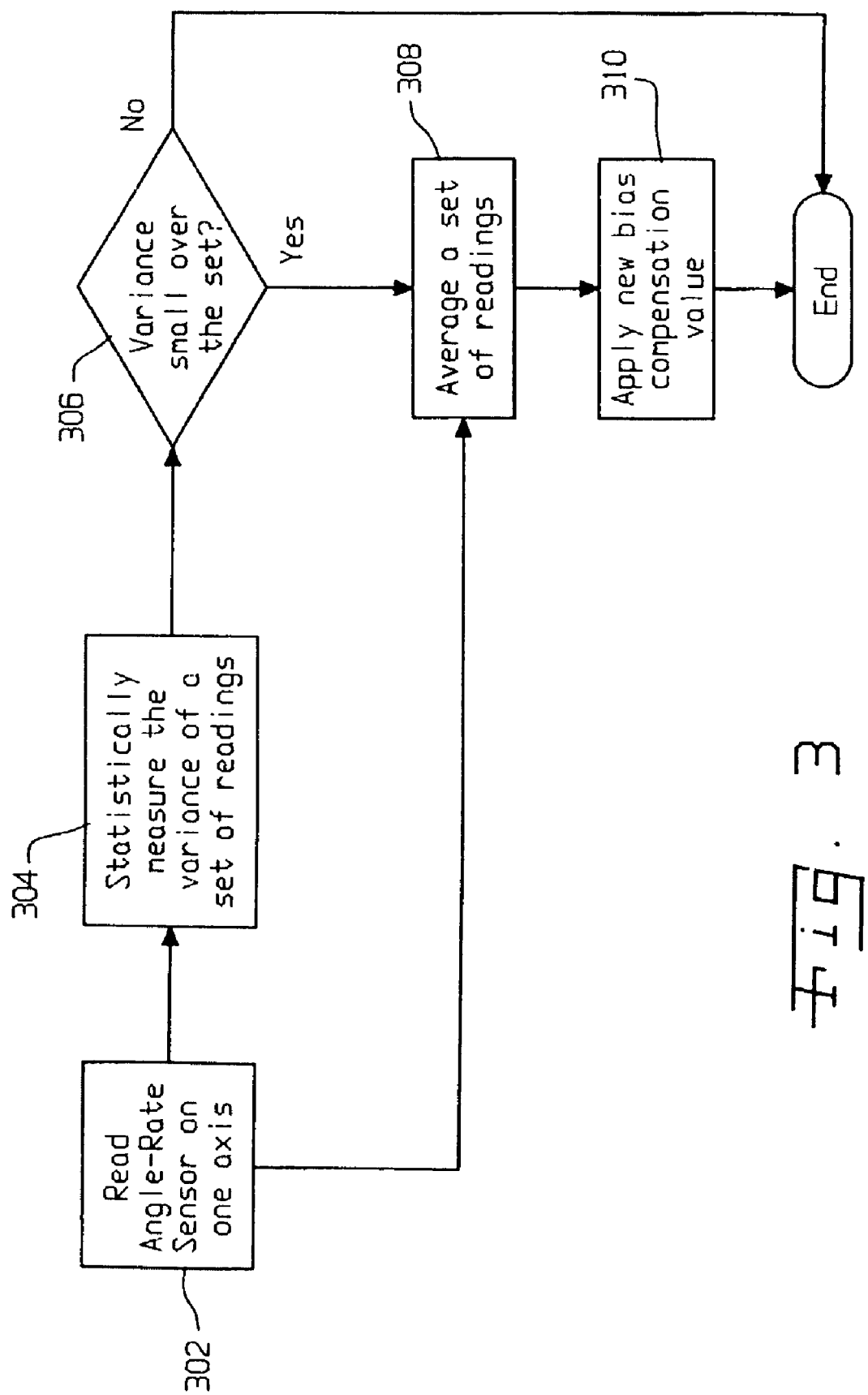
FIG. 3 is a flow chart of one embodiment of a method of the present invention for calibrating the angle rate sensors of FIG. 1.

The primary sensors in system 10 may be angular-rate sensors 32. Angle-rate sensors 32 may measure the change in an attitude angle of vehicle 12 over time, and may have an output expressed in degrees per second, for example. Sensors 32 may be coriolis-based. The output of angular rate sensors 32 may be integrated over time to provide a relative angle from startup. The integration will allow any offset error in the zero-voltage output to accumulate with time, so angular-rate sensors 32 may be compensated and calibrated for this. That is, IMU 26 may calibrate relative sensors 32 based upon an output of absolute sensors 28, 30. After the angle-rate sensor is read on one axis (Step 302; FIG. 3) an analysis may be performed on each axis independently using mean-squared error of a sliding window of rate-sensor samples (Steps 304, 306). If the analysis proves that the samples in the window are taken from a non-transient environment, i.e., the variance is small, a flag may be set. When the flag is set a given number of times in a row, then it may be deemed safe to begin using the sample data for offset error compensation. This rigorous test may help ensure that no large transients creep into the sample data, even if most of the other samples are near 0 degrees/second. Once this test has been passed, the offset error may be calculated by using another sliding window of rate sensor data which lags the previous window by half of the window length. An average of the windowed data may be taken (Step 308), and this value may be combined with the existing offset error value using a filter (not shown) to thereby apply a new bias compensation value (Step 310). This algorithm may enable the offset error to be corrected dynamically, and may also ensure that only legitimate offset error value are read from the rate sensors.

Linear accelerometers 28 may provide absolute tilt angles relative to earth 22, but they may need to be compensated for non-gravitational accelerations such as centripetal and braking accelerations. One method uses a speed sensor (not shown). Lateral acceleration may be calculated using the yaw-rate and the tangential speed along the arc of the turn, while longitudinal acceleration may be calculated from the change in speed.

In another method, a speed sensor is not used. Assuming that the final angles in each axis are correct, they may be used to transform the tri-axial accelerometer's vector from the vehicle coordinate system to the earth coordinate system. Once done, the magnitude of the z-axis accelerometer is approximately the gravitational vector, the magnitude of the x-axis accelerometer is approximately the longitudinal acceleration, and the magnitude of the y-axis accelerometer is approximately the lateral acceleration. These values may be used to correct the accelerometers the next time for a more accurate final set of angles. Because this method of compensation may lead to circular dependencies which may cause drift in the absolute angle, other sensors may be used to provide an independent verification of the calculated accelerations. For example, a near-zero reading on the yaw-rate sensor may indicate a lack of lateral acceleration.

The tri-axial magnetometers 30 may provide an absolute angle relative to magnetic north, but they may need to be compensated for tilt angles and local magnetic field distortion due to the metal and electronics of vehicle 12. The magnetic field distortion may be viewed as a three-dimensional vector in the vehicle coordinate system which is added to the earth's magnetic field vector. Once measured, it can be directly subtracted from the output of magnetometers 30. The corrected output may then be transformed from the vehicle coordinate system into the earth coordinate system using the roll and pitch angles, which may be the previously calculated angles or predicted angles derived from the previous angles and current roll-rates and pitch-rates. After this is done, the heading may be simply the angle of the vector in the x-y plane.

For improved accuracy for the roll, pitch and yaw angles, the strength of the absolute and relative sensors may be combined. The algorithm used for combining the corrected sensor outputs follows from the use of linear accelerometers to measure roll and pitch, and using a blending coefficient to combine this roll and pitch with roll and pitch values calculated by integrated roll-rate and pitch-rate sensors.

Figure 4:
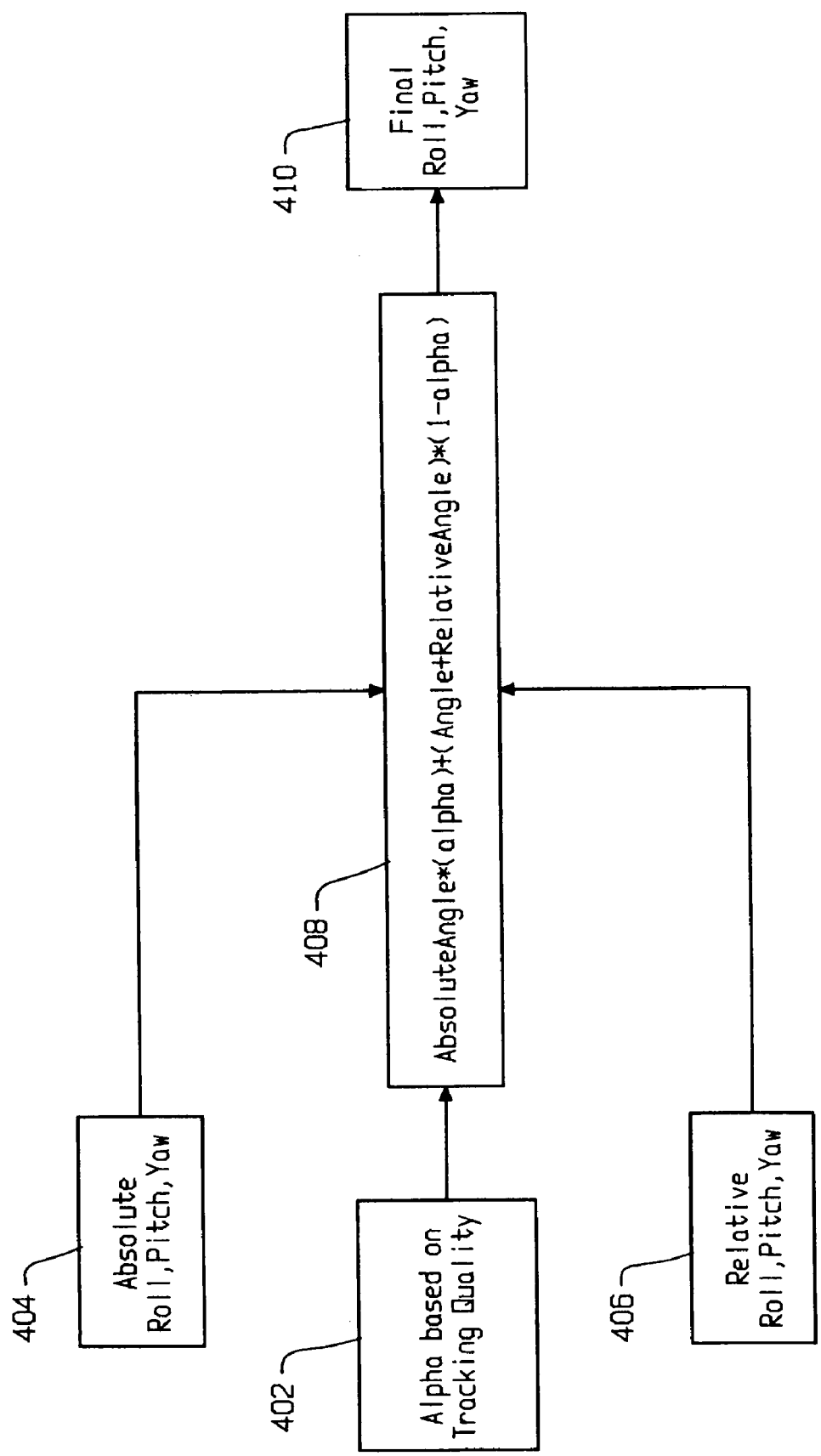
FIG. 4 is a flow chart of one embodiment of a method of the present invention for assigning a variable weighting to the outputs of the sensors of FIG. 2.

One method of using a blending coefficient referred to herein as "alpha" is illustrated in FIG. 4. In this method, antenna pointing device 16 may point antenna 14 in a direction dependent upon a variable weighting of the outputs of absolute sensors, e.g., linear accelerometers 28 and magnetometers 30, and the outputs of relative sensors, e.g. angle rate sensors 32. The value of alpha may be set to different values dependent upon the measured tracking quality of the signal received by antenna 14 from satellite 18, as at 402. Thus, the different values of alpha provide a variable weighting of absolute sensor outputs 404 and relative sensor outputs 406, as shown in 408, to arrive at final roll, pitch and yaw measurements in 410.

The tracking quality of the signal may be based upon the strength of the signal, the length of time since the signal was last detected, or the length of time since the signal last exceeded a threshold level of strength, for example. If the tracking quality is low, it may be indicative of antenna 14 not being pointed in a direction that it is believed to be pointed, and thus it may be appropriate to increase the value of alpha to thereby give more weight to the output of the absolute sensors. The absolute sensors, which rely on constants such as gravity and the earth's magnetic pole, are more likely than the relative sensors to have at least a minimum level of accuracy. If, on the other hand, the tracking quality is high, then it may be desirable to use a lower value of alpha and thereby make more use of the outputs of the relative sensors.

The blending coefficient alpha may be varied depending upon the system mode. At startup, the blending coefficient may be set to 1, which blocks all contribution from angular rate sensors 32. This allows the absolute sensors 28, 30 to determine an initial vehicle attitude. After a short period of time, the blending coefficient may be set to the normal run value which favors angular rate sensors 32. Thus, the present invention enables the antenna to be pointed directly at, or at least in the general direction of, satellite 18 immediately after startup, or immediately after the end of a signal blockage, without any kind of scanning across the sky in search of the satellite.

When there is minimum motion in a given axis and there is a weak correlation/sensitivity to that axis in the measurable pointing error, the combined effect of the sinusoidal error correction and the integrated angle rate bias error may result in a larger error than what would otherwise be obtained with absolute sensor measurements alone. Periodically during normal run mode, when motion in a given axis is at a minimum, the blending coefficient for that axis may be set closer to one to allow absolute sensors 28, 30 more influence on the axis' angle. This may help offset drift error in the angular rate sensor integration. This may also occur if the feedback of satellite pointing error is lost for a period of time. The blending coefficient may also be set closer to one when pointing error measurements are not available to offset drift error in the angular rate sensor integration. The assumption would be that the drift in the angle rate sensors 32 may have become large, and their contribution may need to be reduced temporarily until their bias error can be measured and, if necessary, compensated for.

The satellite pointing error feedback component of the system may run on top of IMU 26, but may be tightly integrated with IMU 26. Antenna 14 may be electronically steerable in elevation and mechanically steerable in azimuth, although antenna 14 may provide error feedback in azimuth without mechanically moving the antenna beam. The antenna may provide pointing error feedback in both axes during each sample period. Unlike known tracking systems in which the feedback is used to reposition the antenna in azimuth and elevation, the tracking system of the present invention feeds the error feedback back into IMU 26 in order to correct and calibrate the sensors. Thus, IMU 26 effectively uses the signal from satellite 18 as another sensor signal in determining the attitude of vehicle 12.

Because the satellite position measurement is essentially another sensor to IMU 26, the measurement may be used to correct long-term and short-term errors in sensors 28, 30 and 32. Magnetometer 30 may be affected by the effects of vehicle 12 on the local magnetic field, which may be unknown when vehicle 12 rolls off the assembly line and might change over the life of vehicle 12. Accelerometers 28 and angle rate sensors 32 may have slight offsets due to installation errors. All of these errors may be measured by comparing pointing angles to satellite position feedback over the long term.

The pointing feedback signal is in the antenna coordinate system, which may consist of azimuth and elevation axes. Because IMU 26 may operate in the earth coordinate system, a coordinate transformation may be required to feed the pointing error back into IMU 26. The system of the present invention may use an approximation of a more rigorous transformation, which may be a simple distribution of azimuth and elevation into roll, pitch and yaw. Based on small angle approximation, the azimuth error signal may be added into the yaw output of IMU 26. The elevation error signal may be added into the roll and pitch output of IMU 26 in accordance with the vehicle heading relative to satellite 18. In the extreme case, the elevation error may be completely due to roll when satellite 18 is 90 degrees to the right or left of vehicle 12. Likewise, the elevation error may be completely due to pitch when vehicle 12 is heading directly toward or away from satellite 18. In other cases, a sinusoidal relationship may distribute the elevation error.

Figure 5:
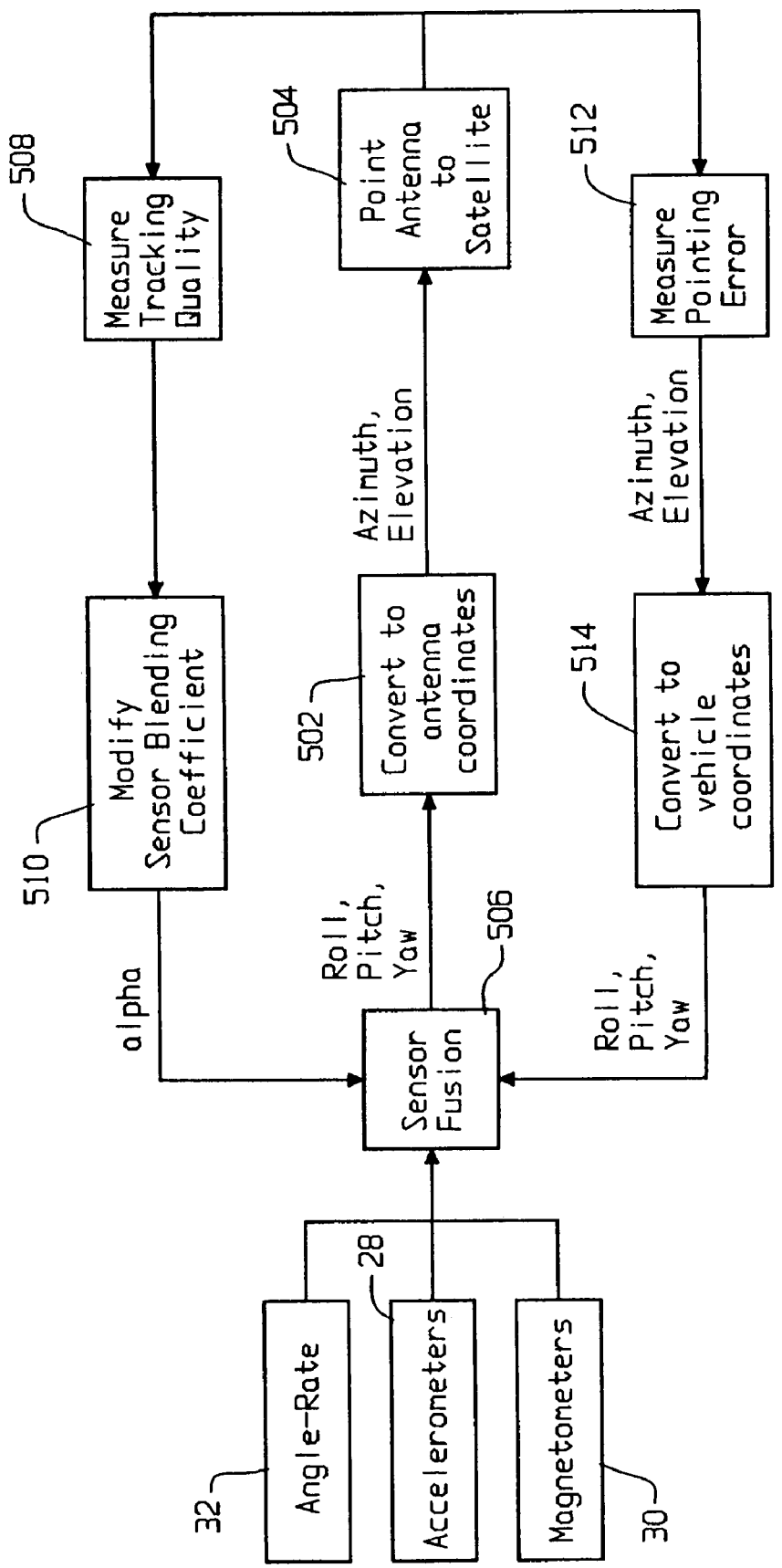
FIG. 5 is a flow chart of one embodiment of a method of the present invention for using the variably weighted sensor outputs of FIG. 4 to determine the direction in which the antenna of FIG. 2 is pointed.

An expansion of the method of FIG. 4 is illustrated in FIG. 5. More particularly, the roll, pitch and yaw determinations 410 of FIG. 4 may be converted to antenna coordinates 502 of FIG. 5. Antenna pointing device 16 may use the antenna coordinates, which may be expressed in azimuth and elevation, to point antenna 14 in a desired direction, as shown at 504. Processor 34 may perform sensor fusion 506, measure tracking quality 508, and calculate alpha in 510. The signal from satellite 18 may be analyzed to measure pointing error in 512, which may then be converted to vehicle coordinates in 514 that may be used in sensor fusion 506.

Figure 6:
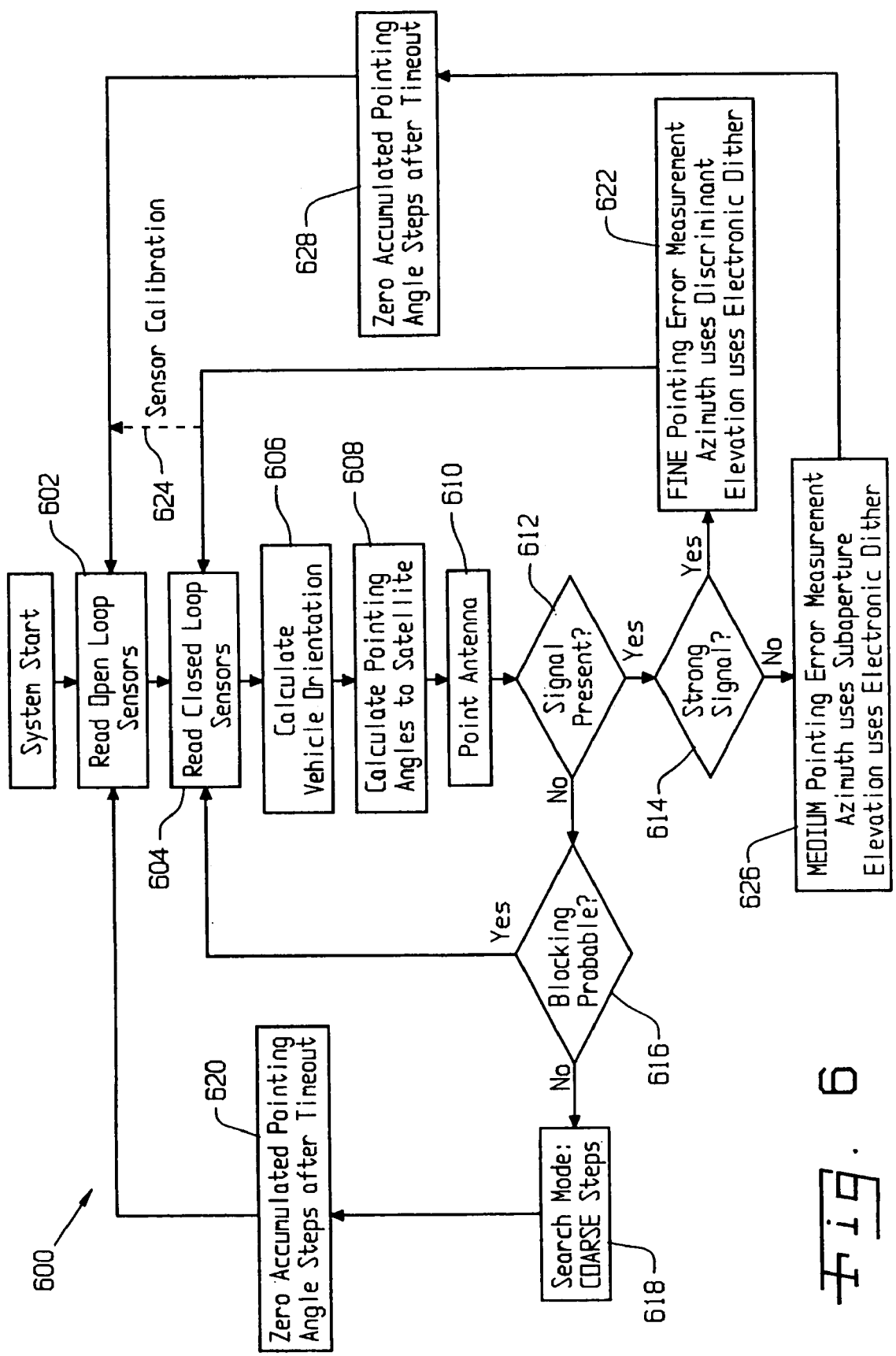
FIG. 6 is a flow chart of one embodiment of a method of the present invention for tracking and acquiring a satellite.

An embodiment of a satellite signal acquisition and tracking method 600 of the present invention is illustrated in FIG. 6. After startup, in step 602, open loop sensors such as angle rate sensors 32 may be read. Open loop sensors may be read if the blending coefficient is close to one. In step 604, closed loop sensors such as linear accelerometers 28 and magnetometers 30 may be read. Closed loop sensors may be read if the blending coefficient is farther from one, e.g., closer to zero. For example, open loop sensors may be read if the blending coefficient is above 0.5, and closed loop sensors may be read if the blending coefficient is less than 0.5. From these readings, processor 34 may calculate vehicle attitude (step 606) and calculate pointing angles to satellite 18 (step 608). After processor 34 transmits signal 36, antenna pointing device 16 may point antenna 14 in the desired direction (step 610). The output of antenna 14 may be received by a receiver 38, and processor 34 or some other processor may determine whether a signal from satellite 18 is present (step 612) and whether the signal strength exceeds a threshold level (step 614). If the signal is not present, and it is determined in step 616 that blocking is probable, then operation returns to step 604. If blocking is not probable, then the satellite may be searched for in coarse scanning steps (step 618). After a timeout, the accumulated pointing angle steps may be set to zero (step 620), and operation may return to step 602. If the signal is strong, fine pointing error measurement is performed in which azimuth uses discriminant and elevation uses electronic dither (step 622), and operation returns to step 602. The fine error measurement may be used to calibrate the open loop sensors, as indicated at 624. If the signal is present but weak, medium pointing error measurement is performed in which azimuth uses subaperture and elevation uses electronic dither (step 626). After a timeout, the accumulated pointing angle steps may be set to zero (step 628), and operation may return to step 602.

Figure 7:
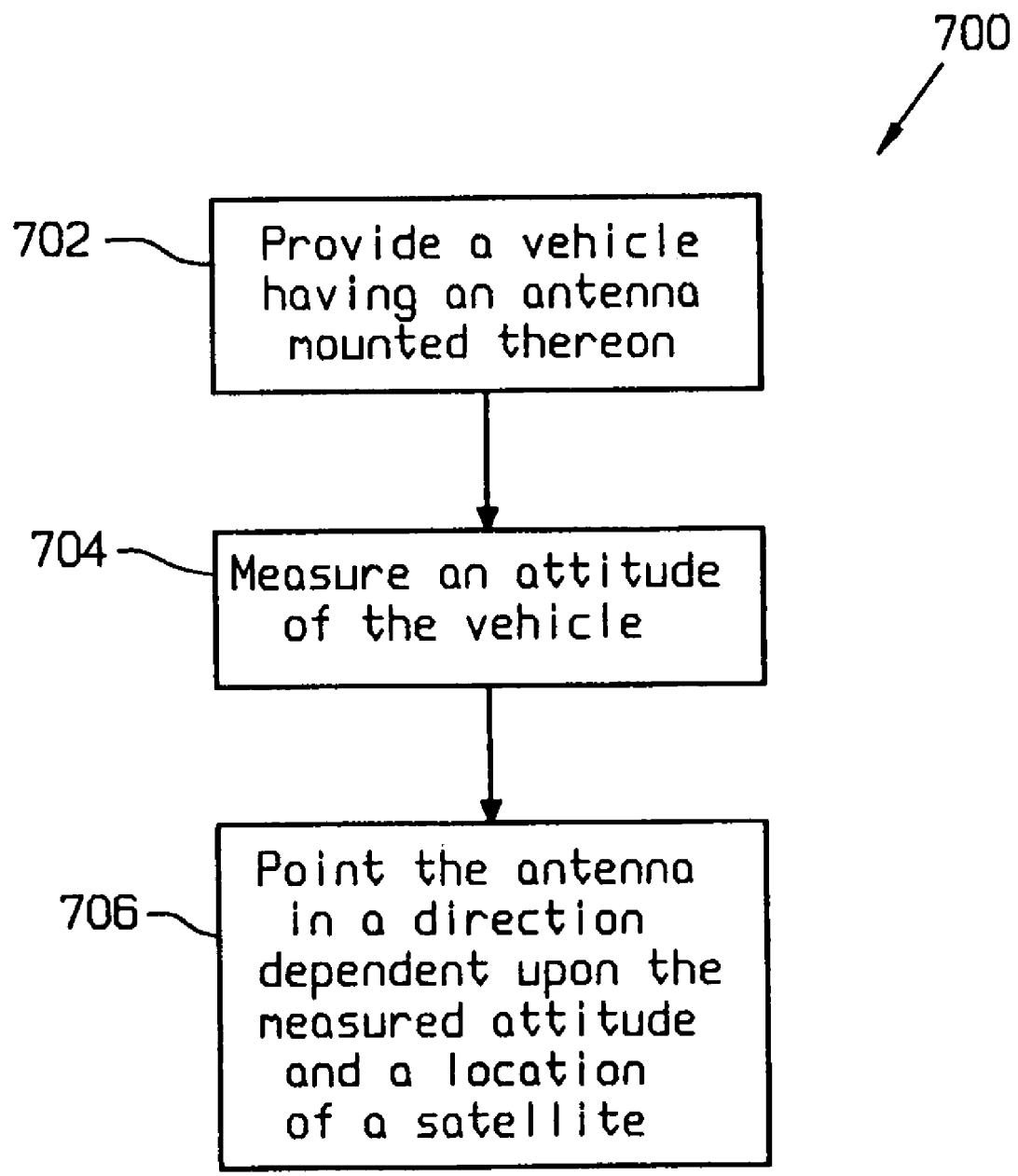
FIG. 7 is a flow chart of another embodiment of a method of the present invention for tracking a satellite.

An embodiment of a method 700 of the present invention of tracking a satellite is illustrated in FIG. 7. In a first step 702, a vehicle having an antenna mounted thereon is provided. For example, a vehicle 12 has an antenna 14 mounted thereon. In a next step 704, an attitude of the vehicle is measured. In one of the disclosed embodiments, IMU 26 may measure the attitude, including roll, pitch and yaw measurements, of vehicle 12. In a final step 706, the antenna is pointed in a direction dependent upon the measured vehicle attitude and a location of a satellite. For example, antenna pointing device 16 may point antenna 14 in a direction that is determined based upon the vehicle attitude measured by IMU 26 and a location of satellite 18 relative to the earth.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A satellite tracking system, comprising:
a vehicle including an attitude measuring device configured to measure an attitude of said vehicle, said attitude measuring device including at least one absolute sensor and at least one relative sensor;
an antenna mounted on said vehicle; and
an antenna pointing device coupled to said antenna and configured to point said antenna in a direction dependent upon:
a variable weighting of outputs of said at least one absolute sensor and said at least one relative sensor; and
a location of a satellite.

2. The system of claim 1 wherein the location of the satellite is predetermined.

3. The system of claim 1 wherein the attitude of the vehicle includes roll, pitch and yaw components.

4. The system of claim 1 wherein said attitude measuring device includes at least one linear accelerometer, at least one magnetometer, and at least one angle rate sensor.

5. The system of claim 1 wherein said attitude measuring device includes:
three linear accelerometers, each said accelerometer corresponding to a respective one of x, y and z axes;
three magnetometers, each said magnetometer corresponding to a respective one of the x, y and z axes; and
three angle rate sensors, each said angle rate sensor corresponding to a respective one of the x, y and z axes.

6. The system of claim 1 wherein the variable weighting is dependent upon a strength of a signal received by said antenna from the satellite.

7. The system of claim 1 wherein said attitude measuring device is configured to calibrate said at least one relative sensor based upon the output of said at least one absolute sensor.

8. A method of tracking a satellite, comprising the steps of:
providing a vehicle having an antenna mounted thereon;
providing an attitude measuring device associated with said vehicle, said attitude measuring device including at least one absolute sensor and at least one relative sensor;
calibrating said at least one relative sensor based upon an output of said at least one absolute sensor;
measuring an attitude of said vehicle using said attitude measuring device; and
pointing said antenna in a direction dependent upon the measured attitude and a location of the satellite.

9. The method of claim 8 wherein the location of the satellite is predetermined.

10. The method of claim 8 wherein the attitude of the vehicle includes roll, pitch and yaw components.

11. The method of claim 8 wherein said attitude measuring device includes at least one linear accelerometer, at least one magnetometer, and at least one angle rate sensor.

12. The method of claim 8 wherein said attitude measuring device includes:
three linear accelerometers, each said accelerometer corresponding to a respective one of x, y and z axes;
three magnetometers, each said magnetometer corresponding to a respective one of the x, y and z axes; and
three angle rate sensors, each said angle rate sensor corresponding to a respective one of the x, y and z axes.

13. The method of claim 8 wherein said pointing step includes pointing said antenna in a direction dependent upon a variable weighting of outputs of said at least one absolute sensor and said at least one relative sensor.

14. The method of claim 13 wherein said pointing step includes varying the weighting dependent upon a strength of a signal received by said antenna from the satellite.

15. The method of claim 8 wherein said pointing step includes pointing said antenna one of electronically, mechanically, and a combination of electronically and mechanically.

16. A method of tracking a satellite, comprising the steps of:
providing a vehicle having an antenna mounted thereon;
providing an attitude measuring device associated with said vehicle, said attitude measuring device including at least one absolute sensor and at least one relative sensor;
setting weighting values of outputs of said at least one absolute sensor and said at least one relative sensor, the weighting values being dependent upon a quality of a signal received by said antenna from the satellite;
measuring an attitude of said vehicle using said attitude measuring device, the measuring being dependent upon the weighting values; and
pointing said antenna in a direction dependent upon the measured attitude and a location of the satellite.

17. The method of claim 16, wherein the quality of the signal comprises one from among a strength of the signal, a length of time since the signal was last detected, and a length of time since the signal last exceeded a threshold level of strength.

18. The method of claim 16, wherein the weighting value of said at least one relative sensor varies with the quality of the signal.

19. The method of claim 16, wherein, at startup, the measuring of the attitude of the vehicle is independent of the outputs of said at least one relative sensor.

20. The method of claim 16, wherein the weighting value of said at least one relative sensor varies with motion in a given axis.

* * * * *